United States Patent [19]

Parzefall

[11] Patent Number: 4,863,005
[45] Date of Patent: Sep. 5, 1989

[54] FRICTION CLUTCH

[75] Inventor: Walter Parzefall, Bubenreuth, Fed. Rep. of Germany

[73] Assignee: INA Walzlager Schaeffler KG, Fed. Rep. of Germany

[21] Appl. No.: 152,890

[22] Filed: Feb. 5, 1988

[30] Foreign Application Priority Data

Feb. 19, 1987 [DE] Fed. Rep. of Germany ....... 3705315

[51] Int. Cl.$^4$ ............................................ F16D 23/14
[52] U.S. Cl. .................................. 192/98; 192/70.13; 192/89 B; 192/110 B
[58] Field of Search ................... 192/98, 89 B, 110 B, 192/70.13, DIG. 1

[56] References Cited

U.S. PATENT DOCUMENTS

| 4,658,945 | 4/1987 | Muller | 192/70.13 |
| 4,667,797 | 5/1987 | Ball | 192/70.13 |
| 4,691,815 | 9/1987 | Maycock et al. | 192/70.13 |

FOREIGN PATENT DOCUMENTS 3539889 5/1987 Fed. Rep. of Germany ........ 192/98

Primary Examiner—Leslie A. Braun
Assistant Examiner—Andrea Pitts
Attorney, Agent, or Firm—Bierman & Muserlian

[57] ABSTRACT

A pull-type friction clutch with a release bearing for a motor vehicle in which at least two locking elements spaced at the periphery of an axially displaceable thrust ring to allow it to engage axially with a rotating inner ring of the release bearing in a manner that these two elements get more firmly locked when pulled away from one another characterized in that the locking elements (15, 16, 17) have an angular cross-section and are mounted on the thrust ring (9) about an axle (18, 19, 20) so as to be able to swing into a locking position, whereby the edges of the locking elements (15, 16, 17) facing the inner ring (22) are shaped as hooks (21) which engage with a collar (24) formed on the inner ring (22) and the edges of the locking elements (15, 16, 17) away from the inner ring (22) have the shape of angle segments (31) whose surfaces (32) bear against the side of the pressure ring (9) facing away from the hooks (21).

11 Claims, 5 Drawing Sheets

FRICTION CLUTCH

STATE OF THE ART

Pull-type friction clutches with a release bearing for a motor vehicle in which an axially displaceable thrust ring and a rotatable inner ring of the release bearing are connected to each other in an axially locked manner by at least two locking elements spaced at the periphery of the thrust ring are known. Such a clutch is described in DE-OS 3,150,150 wherein the locking elements are defined by rollers which in the locking position partly engage the thrust ring and partly engage the inner ring. The tension-proof locking of the inner ring of the release bearing is automatic by urging the rollers into a groove of the inner ring by a spring during insertion of the inner ring into the thrust ring. This, however, requires a narrow tolerance of the position of the groove of the inner ring relative to the thrust ring in the mounting position because otherwise the rollers will be pushed out of the groove during engaging and declutching. In DE-OS 3,150,150, centrifugal forces occurring during operation act on the rollers so that the latter have the tendency to move out of the grooves of the inner ring thereby impairing the locking action.

OBJECTS OF THE INVENTION

It is an object of the invention to provide a clutch device of the above-stated kind which improves the locking of the inner ring with the thrust ring and which does not require a narrow tolerance of the path of insertion of the inner ring during assembly.

This and other objects and advantages of the invention will become obvious from the following detailed description.

THE INVENTION

The pull-type friction clutch with a release bearing of the invention for a motor vehicle in which an axially displaceable thrust ring and a rotatable inner ring of the release bearing are connected to each other in an axially locked manner by at least two locking elements spaced at the periphery of the thrust ring, is characterised in that the locking elements (15,16,17) are swingably mounted on one side on the thrust ring (9) and interlocked on their other side with the inner ring (22) in a locked manner when swivelled towards the latter and released from the inner ring (22) when swivelled away from the latter.

The support on the thrust ring guarantees that the locking elements are fixedly connected with the thrust ring in a constructively simple manner. The swinging ability in connection with the interlocking allows a constructively simple assembly between the thrust ring and the inner ring, on the one hand, and a secure locking, on the other hand. Furthermore, there is no necesity for narrow tolerance in the fitting position of the inner ring relative to the thrust ring. This guarantees during assembly of the release bearing that even at greater tolerances the required locking between the inner ring and the thrust ring is accomplished. There is no danger that the inner ring sits in the thrust ring after assembly so that the locking elements are positioned in a dismantling positon or are moved into the dismantling position during declutching. It is also advantageous that the locking elements can be simply designed so that the centrifugal forces occurring during operation do not force the locking elements into their dismantling position.

According to a preferred construction of simple design of the invention, the edges of the locking elements facing the inner ring are shaped as hooks and the inner ring is provided with a collar which in the interlocked position is engaged from behind by the hooks, thereby allowing a mounting of the inner ring to the thrust ring independently of the respective rotational position of the inner ring relates to the locking elements. It is, however, also possible to provide the locking elements or the inner ring with openings which are engaged by lugs arranged at the periphery of the inner ring or the locking elements, respectively. This requires, however, an alignment of the openings with the lugs during assembly.

According to another preferred development of the invention, at least one of the locking elements and the inner ring have an external slant so that the locking elements swivel during axial shifting and slide over the inner ring. This guarantees that the interlocking is facilitated during assembly.

To attain an automatic interlocking during assembly, the locking elements may be prestressed by means of springs or the locking elements may be provided with legs which are abutted by an extension of the release bearing during assembly so that the locking elements are urged into the interlocking position. In one embodiment of the invention, the locking elements are segments extending jointly essentially about the entire circumference of the inner ring so that considerable release forces may be transmitted in a simple manner from the inner ring via the locking elements to the thrust ring.

Referring now to the drawings.

Figure 1:
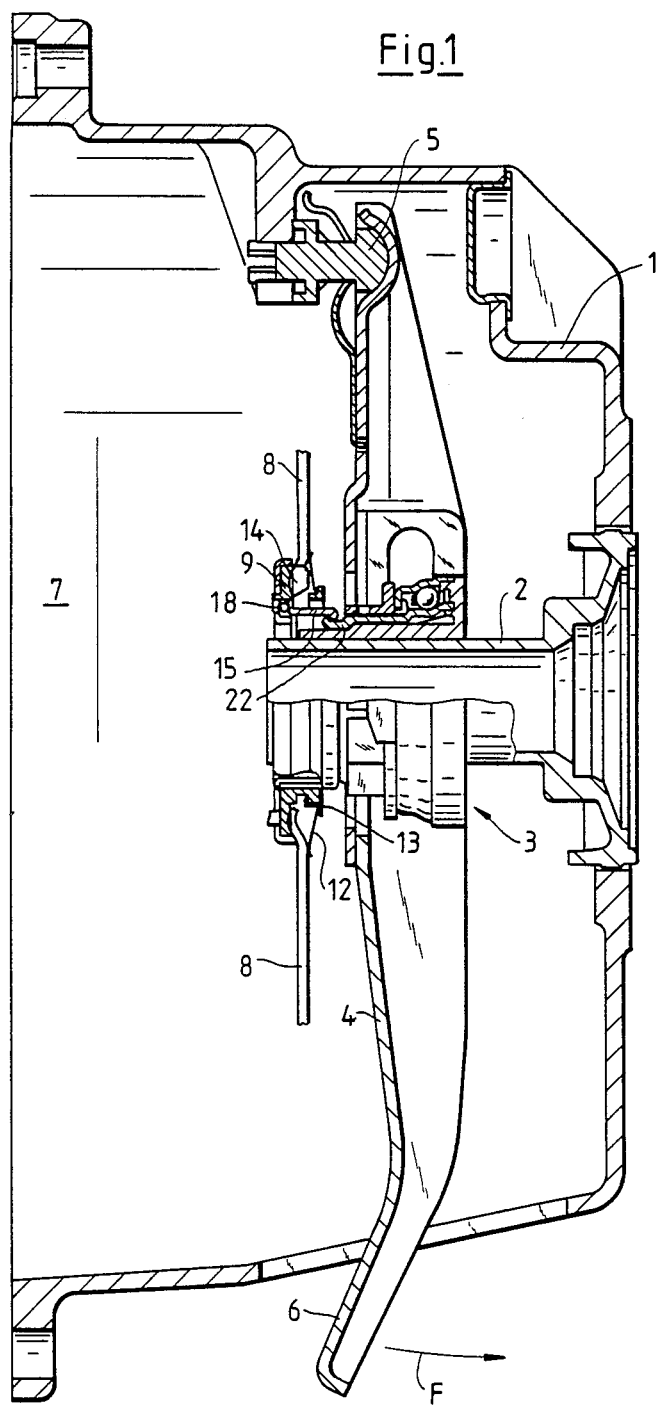
FIG. 1 is a cross-sectional view of a motor vehicle clutch in the area of the release bearing.
Figure 2:
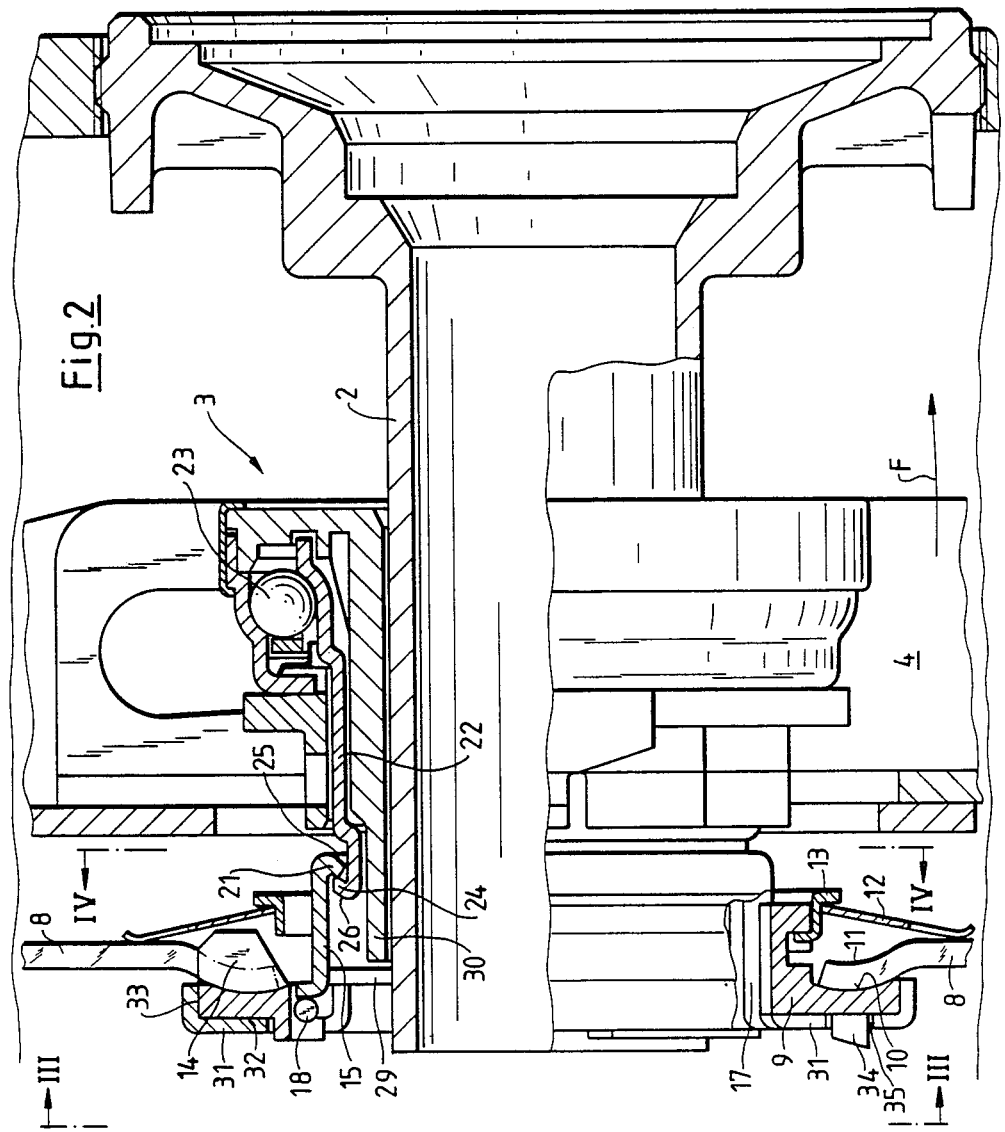
FIG. 2 is a partial cross-sectional view on an enlarged scale in comparison to FIG. 1

Referring to FIG. 1, arranged in a clutch bell (1) is a guide tube (2) for a driving shaft of a gearbox whch is not illustrated in detail. A release bearing (3) is guided for displacement on the guide tube (2) and is engaged by a clutch lever (4). The one free end of the clutch lever (4) is swingably mounted on a support bolt (5) and the other free end (6) is engaged by a mechanical or hydraulic actuating element which is not illustrated in detail. Concerned herewith is a drawn clutch.

The clutch discs which are not shown in detail are located in the area (7) of the clutch bell (1) and a clutch disc spring (8) bears against the one clutch disc. Fixed to the inner circumference of the disc spring (8) is a thrust ring (9) made of polymer plastic material. The thrust ring (9) includes a concave contact surface which supports a mating spring (8) bearing against the one clutch disc. Fixed to the inner circumference of the disc spring (8) is a thrust ring (9) made of polymeric plastic material. The thrust ring (9) includes a concave contact surface which supports a mating curvature (11) of the inner circumference of the disc spring (8). The contact surface (10) could also be designed in a convex shape when respectively designing the shape of the curvature (11). The thrust ring (9) is held to the disc spring (8) by a further disc spring (12) which is supported by the thrust ring (9) via a closing member (13) and bears against the disc spring (8). The closing member (13) is Z-shaped in cross section and attached to the thrust ring (9) by a bayonet-type joint. The thrust ring (9) is fixed to the disc spring (8) by at least one drive element (14) and is secured against rotation, but this is not required.

Figure 3:
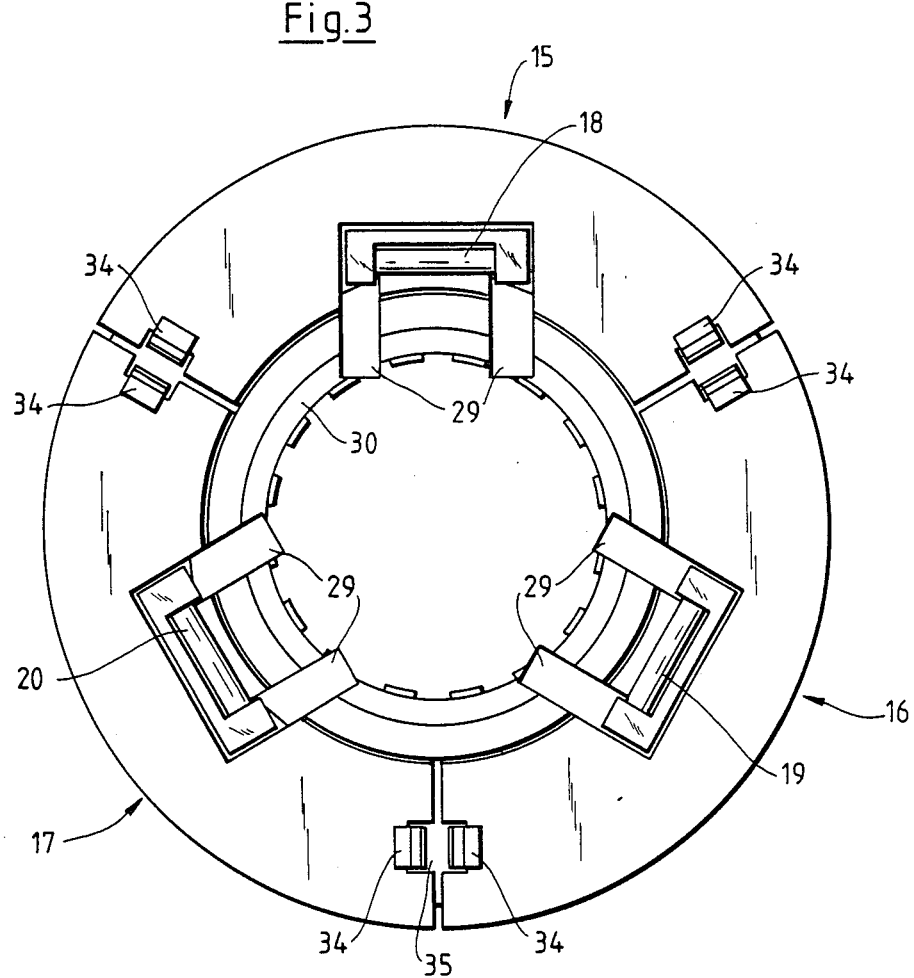
FIG. 3 is a view taken along the line III—III of FIG. 2
Figure 4:
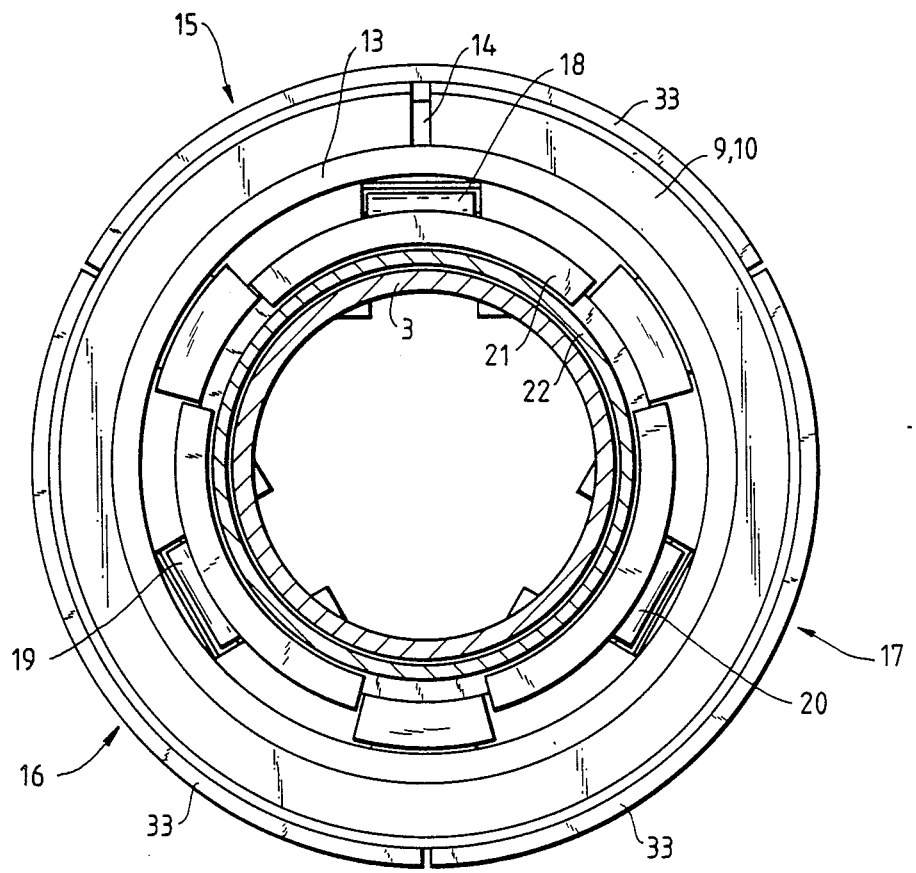
FIG. 4 is a view along the line IV—IV of FIG. 2.

Spaced about the circumference of the thrust ring (9) are three locking elements (15,16,17) swingably mounted about axles (18,19,20). The axles (18,19,20) are arranged at the inner circumference of the thrust ring (9) in the embodiment of FIGS. 1 to 5, and at its outer circumfernce in the embodiment of FIGS. 6 and 7. The locking elements (15,16,17) are designed as circular segments and extend jointly essentially about the entire circumference of an inner ring (22) (compare FIGS. 3 and 7.

At their one edge, the locking elements (15,16,17) are shaped as hooks (21). The release bearing (3) includes the inner ring (22) which is supported in the release bearing (3) by a ball bearing (23) and the inner ring (22) thus rotates with the disc spring (8), the thrust ring (9) and the locking elements (15,16,17). At its end outside the release bearing (3) the inner ring (22) is provided with a collar (24) which is engaged from behind by the hook (21).

The mode of operation is as follows: When swinging the clutch lever (4) for declutching in the direction of the arrow (F), the release bearing (3) is carried along with the inner ring (22) by the clutch lever (4). By the interlock, the inner ring (22) drags along the locking elements (15,16,17) and thus the thrust ring (9) which in turn carries along the disc spring (8) thereby releasing the clutch disc from each other. In the embodiment of FIGS. 1 to 5, the inner ring (2) is externally surrounded by the locking elements (15,16,17) and the hooks (21) and the collar (24) include external slants (25,26, respectively). Moreover, the hooks (21) and the collar (24) are provided with internal slants (27,28, respectively). By the external slants (25,26), the inner ring (22) can slide beneath the locking elements (15,16,17) during assembly and the internal slants (27,28) secure that the interlock is maintained when centrifugal forces act upon the locking elements (15,16,17). The locking element (15,16,17) are provided with legs (29) which extend in front of an axial extension (30) of the release bearing (3).

Arranged at the locking elemet (15,16,17) is an angle segment (31). In its interlocked position, one surface (32) of the locking element (15,16,17) (compare FIG. 2) bears against the thrust ring (9) at its side facing away from the release bearing (3) thereby additionally supporting the thrust ring (9) during declutching so that the clutch actuating force does not have to be transmitted solely by the axles (18,19,20). The other surface (33) of the angle segment (31) abuts the outer circumference of the thrust ring (9).

The thrust ring (9) is provided with restraining lugs (34) for the angle segments (31) interlocked position which engages in cutouts (35) of the angle segments (31). The restraining lugs (34) define an additional safety mechanism against a swinging of the locking elements (15,16,17) upon occurrence of centrifugal forces. They are resilient and maintain the locking elements (15,16,17) in the open position until the extension (30) engages the legs (29).

Figure 5:
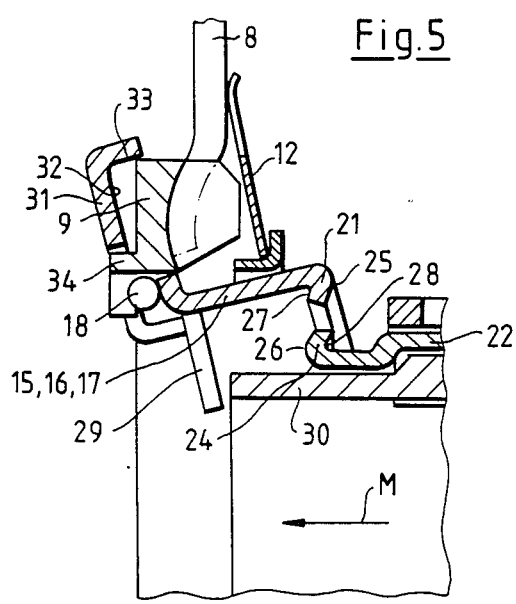
FIG. 5 is a partial cross-sectional view of FIG. 2 in an unlocked position.

The assembly is as follows: Based on the position as shown in FIG. 5 in whch the locking elements (15,16,17) are swivelled away from the inner ring (22), by further shifting the release bearing (3) in the direction of the arrow (M) toward the thrust ring (9), the extension (30) runs against the legs (29), thereby swinging the locking elements (15,16,17) about their axles (18,19,20). The hooks (21) engage behind the collar (24) and the angle segment (31) bears against the thrust ring (9) so that the tension-proof connection between the thrust ring (9) and the inner ring (22) is attained. In any case, even at greater tolerances, a secure interlocking of the locking elements (15,16,17) with the collar (24) is accomplished (compare FIG. 2).

Figure 6:
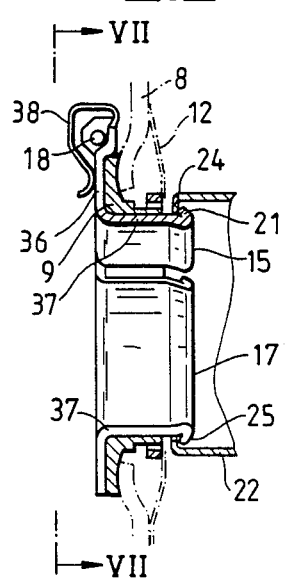
FIG. 6 is a partial view of a further embodiment of the invention and FIG. 7 is a view taken along the line VII—VII of FIG. 6.
Figure 7:
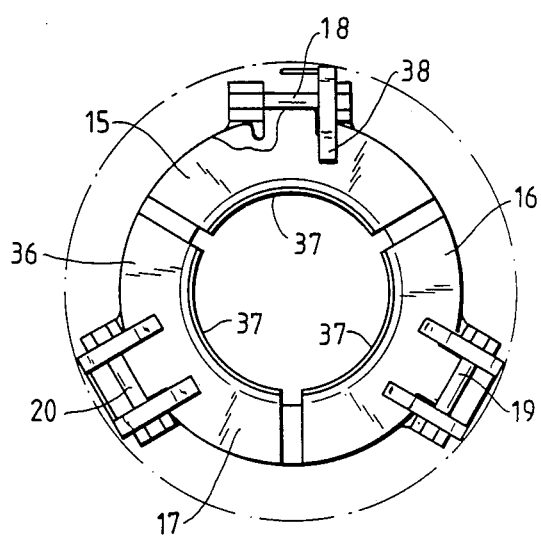

In the embodiment of FIG. 6, the axles (18,19,20) extend at the outer circumference of the thrust ring (9) and an angle leg (36) of the locking elements (15,16,17) bears against the thrust ring (9) at its side facing away from the inner ring (22) similar to the surface (32). A second angle leg (37) of the locking elements (15,16,17) traverse the inner circumference of the thrust ring (9) and has an end provided with a hook (21). In this case, the hooks (21) are disposed within the inner ring (22) so that the collar (24) thereof extends inwardly. Centrifugal forces occurring during operation do not have the tendency in this case to swing the locking elements (15,16,17) away from the inner ring (22). A clip-like spring (38) presses upon the angle leg (36).

During assembly, the inner ring (22) is pushed over the external slant (25) of the hooks (21) so that the locking elements (15,16,17) slightly swing in opposition to the force of the clip-like spring (38) until the hooks (21) engage behind the collar (24). The clip-like spring (38) urges the locking elements (15,16,17) into the interlocked position and thus, no tool is required for the assembly. Also in the embodiment of FIGS. 6 and 7, the actuating force obtained during declutching is not transmitted via the axles (18,19,20) onto the thrust ring (9) and the transfer of force is attained via the angle legs (36) bearing against the thrust ring (9).

Numerous further embodiments are to be considered within the scope of the invention. It is, for example, possible to substitute the legs (29) and the extension (30) in the embodiment of FIGS. 1 to 5 by springs to urge the locking elements (15,16,17) into the interlocked position. It should be understood that the invention is intended to be limited only as defined in the appended claims.

What I claim is:

1. A pull-type friction clutch with a release bearing for a motor vehicle in which at least two locking elements spaced at the periphery of an axially displaceable thrust ring to allow it to engage axially with a rotating inner ring of the release bearing in a manner that these two elements become more firmly locked when pulled away from one another characterized in that the locking elements (15, 16, 17) have an angular cross-section and are mounted on the thrust ring (9) about an axle (18, 19, 20)so as to be able to swing into a locking position, whereby the edges of the locking elements (15, 16, 17) facing the inner ring (22) are shaped as hooks (21) which engage with a collar (24) formed on the inner ring (22) and the edges of the locking elements (15, 16, 17) away from the inner ring (22) have the shape of angle segments (31) whose surfaces (32) bear against the side of the thrust ring (9) facing away from the hooks (21).

2. A clutch of claim 1 wherein the locking elements (15, 16, 17) are provided with legs (29) against which an extension (30) of the release bearing (3) abuts when axially displaced.

3. A clutch of claim 1 wherein the locking elements (15, 16, 17) and/or the inner ring (22) have an external slant (25,26) so that the locking elements (15, 16, 17) swing during axial shifting and slide over the inner ring (22).

4. A clutch of claim 1 wherein the hooks (21) and the collar (24) have internal slants (27,28) so that the hooks (21) are retained by the collar 824) when centrifugal forces act on the locking elements (15, 16, 17).

5. A clutch of claim 1 wherein the locking elements (15, 16, 17) are defined by segments which extend jointly essentially about the entire periphery of the inner ring (22).

6. A clutch of claim 1 wherein the locking elements (15, 16, 17) are swingably mounted on the inner periphery of the thrust ring (9).

7. A clutch of claim 6 wherein the locking elements (15, 16, 17) externally surround the inner ring (22) in the area of the hooks (21).

8. A clutch of claim 1 wherein the thrust ring (9) is provided with retaining lugs (34) for the locking elements (15, 16, 17).

9. A clutch of claim 1 wherein the locking elements (15, 16, 17) are swingably mounted externally on the periphery of the thrust ring (9).

10. A clutch of claim 9 wherein the locking elements (15, 16, 17) are located within the inner ring (22) in the area of the hooks (21).

11. A clutch of claim 9 wherein a spring (38) rests against the locking element (15, 16, 17) and urges the latter into a locking position.

* * * * *